Sept. 30, 1930.  A. N. BLAZER  1,777,250
CUTTING THE EFFICIENT CURVE IN THE WALLS OF HELIXES
Filed April 2, 1928
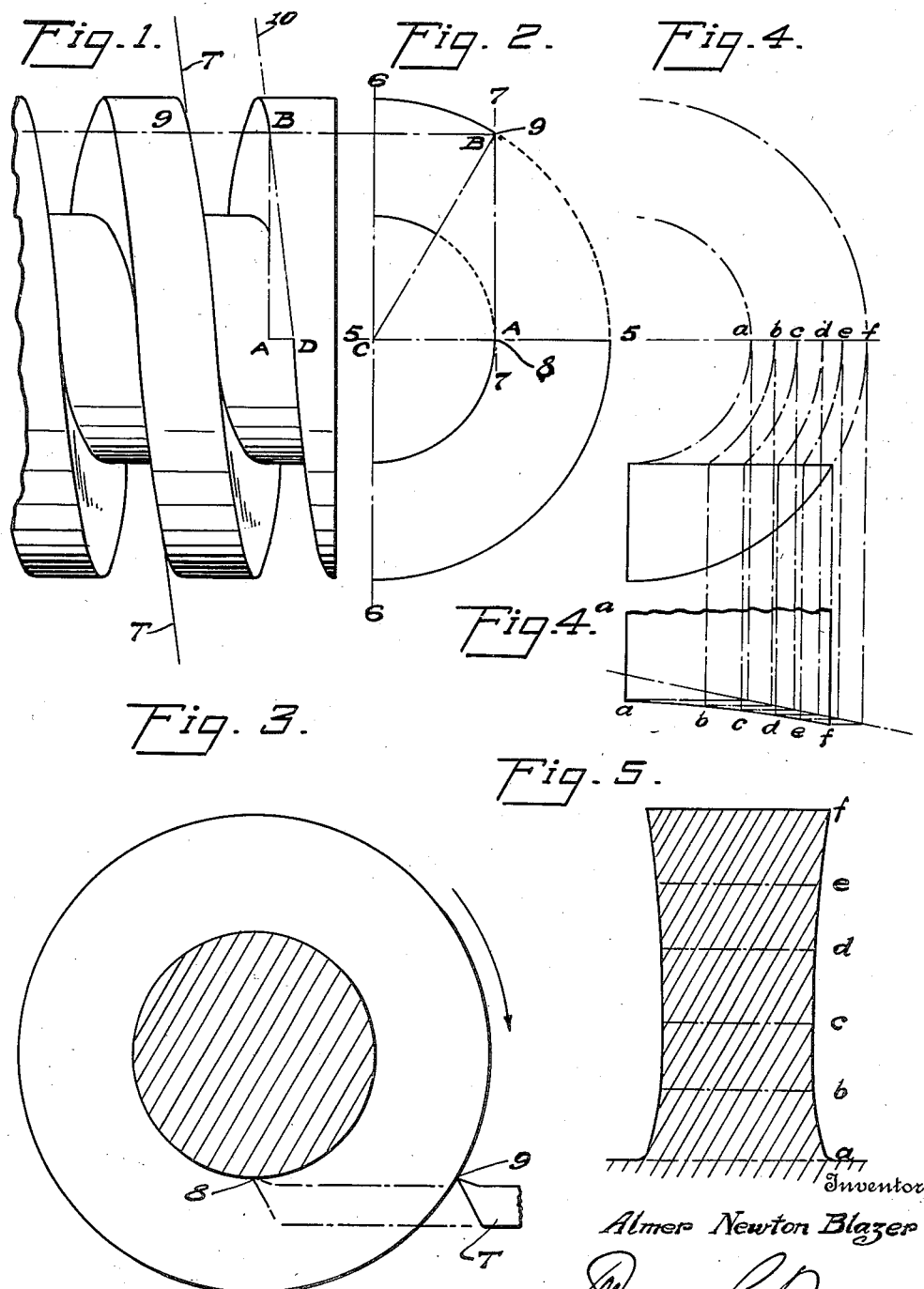
Inventor
Almer Newton Blazer
By
Attorney Patented Sept. 30, 1930

1,777,250

UNITED STATES PATENT OFFICE

ALMER NEWTON BLAZER, OF MESCALERO, NEW MEXICO

CUTTING THE EFFICIENT CURVE IN THE WALLS OF HELIXES

Application filed April 2, 1928. Serial No. 266,633.

This invention relates to improvements in the method of producing the concaved recesses in the walls of intermeshing helixes, such as used in spiral rotary pumps and engines and whereby the inter-meshing members thereof rotate freely in close relation.

An object of the invention is to provide a means of generating the curves of such recesses to the form that gives the highest efficiency to such pumps and engines when incorporated therein.

Another object of the invention is to provide an efficient and economical means of generating the efficient curve of such recesses without the use of complicated tools or machinery.

Another object of the invention is to provide a means of generating such curves that is universally applicable to all helixes required for any size or proportion of such pumps and engines.

The present invention consists essentially in generating the curve of such recesses to conform to a straight line which, for the purposes of this description, is designated the generating line.

The required curve being that most nearly conforming to a perfect fit of the intermeshing members, and securing the highest efficiency is designated the efficient curve.

The generating line must lie in a plane tangent to the hub of the helix which is designated the generating plane.

The generating line must meet the base of the helix in the generating plane designated the tangent point.

The generating line must also meet the wall of the helix at the intersection thereof with the periphery of the helix at the point of intersection of the generating plane therewith which point is designated the intersection.

From this specification it is apparent that the efficient curve is determined by the diameter of the hub, the run of the helix and the outer diameter thereof, with reference to the proportionate dimensions of these three parts, which I designate as factors for the purpose of this description.

In the accompanying drawings:—

Figure 1 is a view of a cylindrical helix, with single thread;

Figure 2 is a cross-section of one-half of the same;

Figure 3 is also a cross-section through the helix showing the position of the tool in full lines at the starting point and in broken lines at the finishing point; and Figures 4, 4ª and 5 illustrate the methods of the cut whereby the desired curved wall is formed.

Referring to the drawings, 5—5 designates the horizontal axial plane, and 6—6 that plane perpendicular thereto, 7—7 indicates the generating plane, 8 the tangent point, and 9 the intersection.

The angle of the generating line with reference to 6—6 is determined by points 8 and 9, and may be found theoretically as follows:—

In Figure 2, BC is the known radius of the helix, CA is the known radius of the hub, lying in plane 5—5, AB is perpendicular to AC; therefore, the angle A is known to be 90 degrees and the depth of the generating plane AB is determined by the solution of the triangle ABC, the angle C being determined by the same progress.

The arc of the angle C is the generating arc of the efficient curve, which may not exceed 90 degrees, and bears the same relation to the circumference of the circle that the run of the helix through the generating arc bears to the run in one revolution of the helix; AD Figure 1 thus found, is the run of the helix through the generating arc, and the solution of the triangle ABD gives the tangent of angle D which is the generating angle required for the generation of the efficient curve for the given factors.

In the practical application of this invention to the generation of the efficient curve, it is not essential that the angle of generation is predetermined, as it may be established mechanically as follows:

The helixes for any inter-meshing pair, of any required dimensions, having been produced by any ordinary method, with the walls perpendicular to the axis thereof, are mounted individually in any machine adapted to cutting such helix, and any tool adapted to cut the desired finish, is set to cut in the generating plane and the feed adjusted to an angle that will meet the point of intersection and the tangent point. With the tool so set, and the feed so adjusted, the efficient curve will be generated when the machine is operated as in cutting a helix, and when each wall of the inter-meshing helixes are so generated, the inter-meshing members thereof will revolve freely together with the least necessary clearance and secure the greatest efficiency for the pump or engine wherein such helixes are incorporated.

This operation is illustrated in the accompanying drawings at Figure 3, wherein the tool T is shown in full lines beginning the cut at the intersection 9 and in broken lines finishing the cut at the tangent point 8; the obliquity of the generating line will be seen at Figure 1 where it is indicated at 10; and the theory is illustrated in Figures 4, 4ª and 5 showing how the radii meet the circular lines of the cut at different lengths to produce the curve.

In carrying out this method, the tool T for cutting the curve may have a straight edge, providing it be set so that such straight edge lie in the generating plane and meet the base of the helical wall at the point A, and also meet the face of the helix at point B, these points determining the obliquity of the generating line and, consequently, the cut, with reference to the axis of the helix in any combination of diameters, size or lead.

With a point cutting tool located to cut in the generating plane, the helix is revolved and the tool carried as in cutting the helix, the tool being fed from point 9 to point 8 by any means adapted to the machine which is used, and by this means the tool follows the generating line 7 across the curved lines produced by the rotation of the helix as illustrated in Figs. 4, 4ª and 5.

It is thus apparent that the cut must be made against the lead of the helix being cut, and, consequently, the work must be reversed to cut the different sides of the helix, or some equivalent method used to accomplish the same result.

It is apparent that the foregoing description is pertinent to any cross-section of any helix, and that any desired change in the dimensions of either of the controlling factors may be had from any point to any other point in the travel of the same helix without changing the specifications pertinent to such points or any intermediate point. The factors at any given point determine the specifications at such point which, in turn, control the angle of the generating line which produces the efficient curve pertinent to such given point. Therefore, the efficient curve is maintained throughout the length of a helix having irregular proportions.

It is observed in the application of this invention that a termination of the generating line is constant in the axial plane perpendicular to the generating plane at the tangent point and that the efficient curve will be generated in the walls of a helix of any required size and proportions, when such terminus is maintained in such plane while the generating line is oscillated thereon to maintain its position at the point of intersection as determined by the factors pertinent thereto.

This may be accomplished by well known methods and would depend on many conditions, as the machine to be employed, the size and material of the helix and many others, according to the skill and judgment of the operator.

From the foregoing description of this invention, it will be seen that the straight line method of generating the efficient curve in the walls of helixes for spiral rotary pumps and engines has many advantages, among which is the fact that any helix may be generated to the efficient curve without resort to formed tools, and that tools adapted to the efficient cutting of such substances as may be required for the helix are adapted to this method. The straight line method provides means of extending the depth of the generating plane to any extent required to generate a helix of varying depth of the inter-meshing members while maintaining the efficient curve throughout its length, thereby providing for the expansive value of fluids under pressure, as in an engine, or in the compression of such fluids as in an air compressor, in which case, no other means will give the best efficiency.

The straight line method provides an accurate, economical and efficient means of generating the efficient curve, and avoids all probability of error common to other methods, and a means applicable to the economical production of spiral rotary pumps and engines in quantities by modern methods is the result.

The straight line method is subject to modification whereby other than the efficient curve may be generated by changing the angle of the generating line according to requirements.

The description thus far refers only to helixes mounted on parallel shafts, but when the shafts on which the helixes revolve are not parallel, the angle is determined from the mean of the axis of the shafts; that is to say, instead of line 6—6 as a basis, the angle would be determined from a line through the pitch diameter of the pair of helixes in working positions.

I claim:—

1. The herein-described method of cutting concaved recesses in the walls of helixes, consisting in rotating the helix and simultaneously cutting one side wall of the helix with a single fixed tool positioned with the cutting end thereof at an oblique angle to the longitudinal axis of the stock of the helix to be formed and with the body of the tool parallel with a diametrical line of the helix, the cutting end of said tool being started at a generating line at the periphery of the rotating helix equal to the radius of the bottom of the helix from the diametrical line of the stock.

2. The herein-described method of cutting concaved recesses in the walls of helixes, consisting in rotating the helix and simultaneously cutting one side wall of the helix with a single fixed tool positioned with the cutting end thereof at an oblique angle to the longitudinal axis of the stock of the helix to be formed and with the body of the tool parallel with a diametrical line of the helix, the cutting end of said tool being started at a generating line at the periphery of the rotating helix equal to the radius of the bottom of the helix from the diametrical line of the stock, and removing and reversing the helix and subjecting the remaining wall to the same tool rotation and operation.

3. The herein-described method of generating the efficient curve in the walls of intermeshing right and left hand pairs of helixes having radially perpendicular walls, which consists in rotating each helix on its axis and simultaneously cutting a straight line across the advancing wall thereof by a tool positioned in advance of the normal cutting position at the diametrical line of the stock, moving said line of cut laterally in coordination with the run of the helix, said line of cut being parallel to the diametrical plane of the helix, at a distance from said plane equal to the radius of the base of the helix from the axis thereof and oblique to the axis of the helix and touching the wall being generated at the base and at the periphery thereof throughout the length of the helix, 'and reversing the helix and submitting the remaining wall thereof to the same rotation and tool operation.

In testimony whereof I have hereunto set my hand.

ALMER NEWTON BLAZER.